United States Patent [19]

Cooper

[11] Patent Number: 5,155,922

[45] Date of Patent: Oct. 20, 1992

[54] DEPTH MEASURING DEVICE WITH WEAR RESISTANT GUIDE MEANS

[75] Inventor: Neal S. Cooper, Sugarland, Tex.

[73] Assignee: Schlumberger Technology Corporation, Houston, Tex.

[21] Appl. No.: 594,523

[22] Filed: Oct. 9, 1990

[51] Int. Cl.$^5$ ............................ G01B 5/04; G01B 3/12
[52] U.S. Cl. ........................................ 33/748; 33/747; 33/735
[58] Field of Search ................. 33/734, 732, 733, 735, 33/746, 747, 748, 744, 772, 719, 720

[56] References Cited

U.S. PATENT DOCUMENTS

| | | | |
|---|---|---|---|
| 1,768,809 | 7/1930 | Orstrand | 33/748 |
| 2,197,196 | 4/1940 | Schlup | 33/732 |
| 2,232,956 | 2/1941 | Mathey | 33/748 |
| 2,466,251 | 4/1949 | Martin | 33/732 |
| 2,654,955 | 10/1953 | Moser | 33/748 |
| 2,707,332 | 5/1955 | Smith | 33/748 |
| 2,794,951 | 6/1957 | Broding et al. | 33/732 |
| 3,318,005 | 5/1967 | Petersen | 33/748 |
| 4,179,817 | 12/1979 | Lavigne et al. | 33/735 |

OTHER PUBLICATIONS

"A synthesized ceramic joins the high-temperature big leagues" by L. M. Sheppard Advanced Materials & Processes Jan. 1986, pp. 35-39.

Primary Examiner—William A. Cuchlinski, Jr.
Assistant Examiner—C. W. Fulton
Attorney, Agent, or Firm—Henry N. Garrana; John H. Bouchard

[57] ABSTRACT

A cable length measuring device, comprises guide rollers for maintaining the cable in a straight line along a given segment of a line, and two encoding wheels disposed tangentially to the straight segment cable; additional guides, the ends of which bearing against the cable are made of a wear resistant material, are provided between the guide rollers and the tangential wheel/cable contact area.

12 Claims, 5 Drawing Sheets

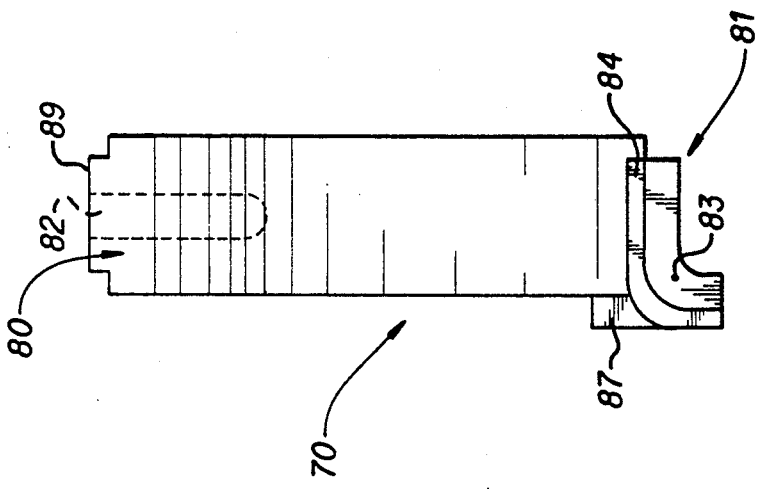
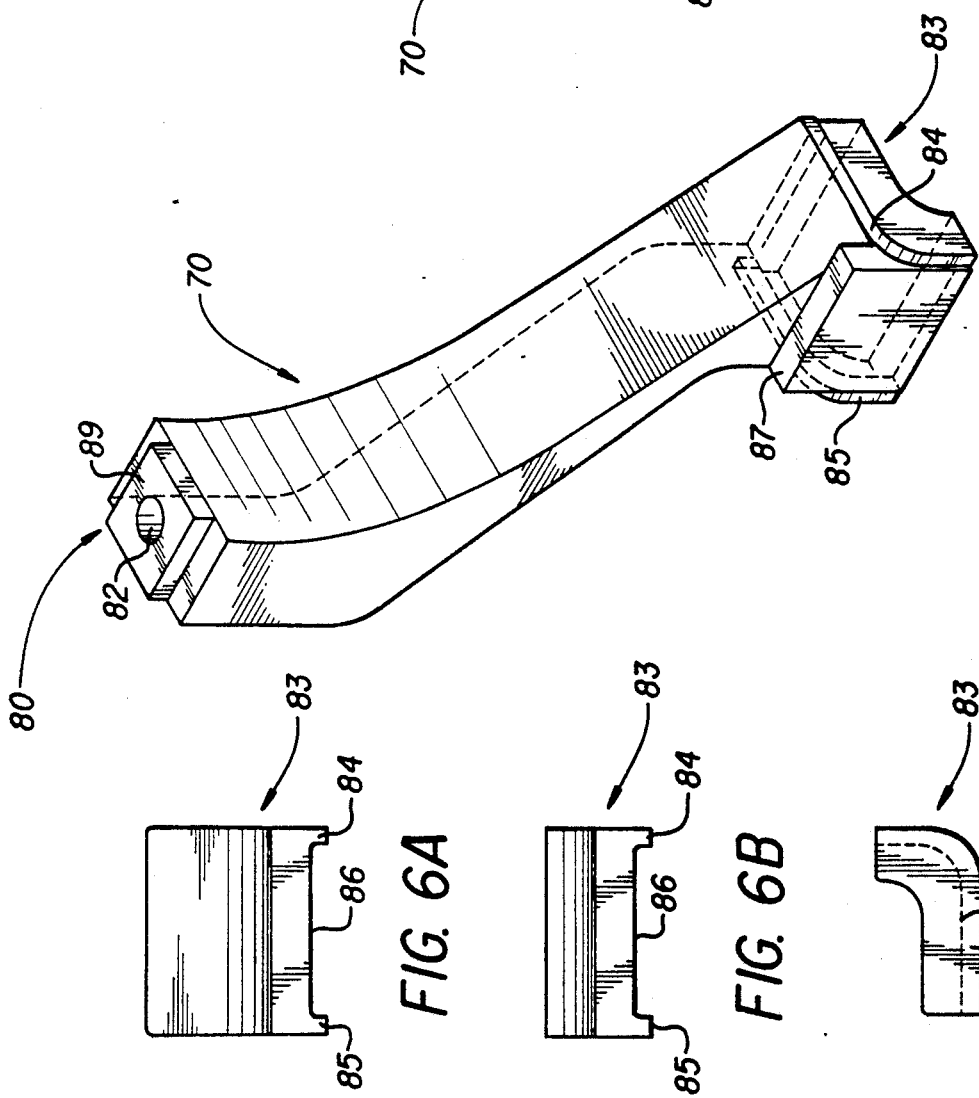

DEPTH MEASURING DEVICE WITH WEAR RESISTANT GUIDE MEANS

BACKGROUND OF THE INVENTION

1. Field of the Invention

This invention relates to an apparatus for measuring the length of cable either unwound from or wound on a drum or winch. The invention may find a particular application in measuring the depth of a logging sonde attached to one end of a cable and lowered in a borehole traversing earth formation, such sonde being designed to carry out measurements relative to the physical/chemical characteristics of the earth formation surrounding the borehole and/or the content of the borehole itself.

2. The Related Art

It is of the highest importance to be able to determine with reliability and accuracy the position of a logging sonde in a borehole, in order to match the physical-chemical characteristics, derived from the measurements carried out by the logging sonde, with the geological layer or the borehole location of interest, both located at a given depth. This depth determination is all the more critical in cases, which appear to be more and more common, where different logging sondes are run in the borehole at different times, and the different measurements are then merged for processing by computer. In such merging and processing, it is important that measurements obtained from a given point in a borehole on one run be merged accurately with all additional measurements obtained from the same depth point on other runs.

The determination of the depth of a sonde in the borehole usually involves two methods. The first method is based on markers, usually magnetic, placed on the cable at known depths or intervals and under known reference conditions. However, the measurements derived from these markers may be inaccurate due e.g. to an undetected permanent (plastic) cable elongation.

According to the second depth measuring method, to which is directed the present invention, one detects and counts the revolution of one, and preferably two calibrated wheels (hereafter called "encoding wheels") bearing tangentially against the cable. The two wheels are disposed on either side of the cable, in the same plane. A general over view of such system can be found e.g. in U.S. Pat. No. 4,179,817 to J. C. Lavigne and G. Segeral, assigned to the assignee of the present application.

This kind of measuring system is subjected to several sources of error and varying conditions which jeopardize both accuracy and repeatability. The linkage between the wheels and the associated devices and the devices themselves place a torque load on the wheels which, under adverse conditions often present at the borehole site, causes errors in the depth measurements due to slippage between the wheel and the cable. The errors resulting from slippage are all the more sizeable that slippage may exist undetected for relatively long periods.

Further, changes in the circumference of the wheel produce additional instability, uncertainty and inaccuracy to the measurements. These changes in the circumference may have various origins, such as e.g. mud buildup on the wheel, or differences in contact area and variations in the pressure between the wheel and the cable, or finally temperature changes which can be substantial on a well site. A further major cause of circumference change is the drastic wear of the periphery of the wheels due to the tangential contact area between the cable and the wheel, which results in a high stress on the wheel material.

Variations in the wheel-cable contact area are important, since this varies the distribution of the pressure between the cable and the wheel. Thus, one requirement for accurate cable measurements under well logging conditions is the placement of the encoding wheels at a point on the cable where the contact area will not vary and where contact forces are not sufficient to distort either the cable or the wheel.

In a known manner, in order to maintain the cable in a straight line along a given segment including the tangential point of contact between the wheels and the cable, there are provided two sets of guiding means, each including two rollers, and being disposed on either side of the tangential point, along the cable axis.

However, this implementation, although it allows one to define a straight cable segment, is not sufficient to fully isolate the straight cable segment from the various forces and torques to which the cable is submitted between the winch and the upstream guiding means and between the downstream guiding means and the structure erected above the well. Such forces e.g. are due to the spooling of the cable on the winch which generally causes cable path curvature and acceleration forces. Considerable lateral forces are required to deflect the cable at a certain angle from a center line. These forces are extreme when the cable is held against the flanges of the winch in order to start each new layer. Furthermore, the cable presents a "natural" curvature due to the "memory" of the cable which is for the most time wound on the winch. The straight segment of cable between the guide means transmits the forces and torques to the tangent encoding wheels, to the detriment of the contact area. This is all the more detrimental since each guiding means cannot usually be placed closer to the tangential contact point than one foot apart.

As an attempt to remedy these problems, one has proposed to provide additional guiding means placed close to and on each side of the wheel/cable tangential contact area. Each additional guide means comprises a pair of arms disposed on either side of the cable. Each arm has its end bearing against the cable configured in U-shape form, in order to define a guiding area substantially complementary to the cable. However, these arms being made of a material of low density, such as aluminum, for weight reduction purpose, wear relatively rapidly and thus shortly do not play any guiding role.

Therefore, there is a need for a reliable and accurate device for measuring the length of cable either wound on or unwound from a winch, especially in the application of logging for an accurate and reliable determination of the depth of a logging sonde lowered in a borehole.

SUMMARY OF THE INVENTION

Accordingly, an object of the present invention is to propose a reliable and accurate cable length measuring device provided with a satisfactory contact between the encoding wheels and the cable, through improved guiding means allowing to maintain firmly and in a reliable way the cable in a straight line close to the contact area where the wheels bear against the cable.

To attain these and other objects, it is proposed a cable length measuring device, comprising:
- first guide means for maintaining the cable in a straight line along a given segment of a line;
- at least one encoding wheel disposed tangentially to the straight segment cable;
- second guide means disposed between the first guide means and the tangential point of contact, and being made, at least at its end bearing against the cable, of a wear resistant material;
- sensors for detecting the revolution of the encoding wheel; and
- means for counting the number of wheel revolutions and converting the revolutions into cable length.

The invention also contemplates a device for measuring the depth of a logging sonde lowered in a borehole traversing earth formation through a cable wound a winch, comprising:
- first guide means for maintaining the cable in a straight line along a given segment of a line;
- at least one encoding wheel disposed tangentially to the straight segment cable;
- second guide means disposed between the first guides and the tangential point of contact, and being made, at least at its end bearing against the cable, of a wear resistant material;
- sensors for detecting the revolution of the wheel; and
- means for counting the number of wheel revolutions and for converting the revolutions into depth value of the logging sonde in the borehole.

In a preferred embodiment, the second guide means comprises at least one arm provided, at its end bearing against the cable, with an insert made of a wear resistant material, such as e.g. tungsten carbide, stainless steel or a ceramic such as $Al_2O_3$.

The invention may be better understood from the following detailed description of typical embodiments, taken in conjunction with the accompanying drawings, in which:

BRIEF DESCRIPTION OF THE FIGURES

FIG. 4 is a perspective view of a guiding arm;

FIG. 5 is a side view of the arm of FIG. 4;

FIG. 6A, 6B and 6C are respectively a top view, a front view and a side view of a wear resistant insert.

DESCRIPTION OF THE PREFERRED EMBODIMENT

The invention will be hereafter described in connection with an embodiment related to the logging techniques, although the invention may have other possible application where it is necessary to measure the length of a cable either wound on or unwound from a winch. As a matter of general interest, the apparatus of the invention will be referred to as a depth measuring device.

Figure 1:
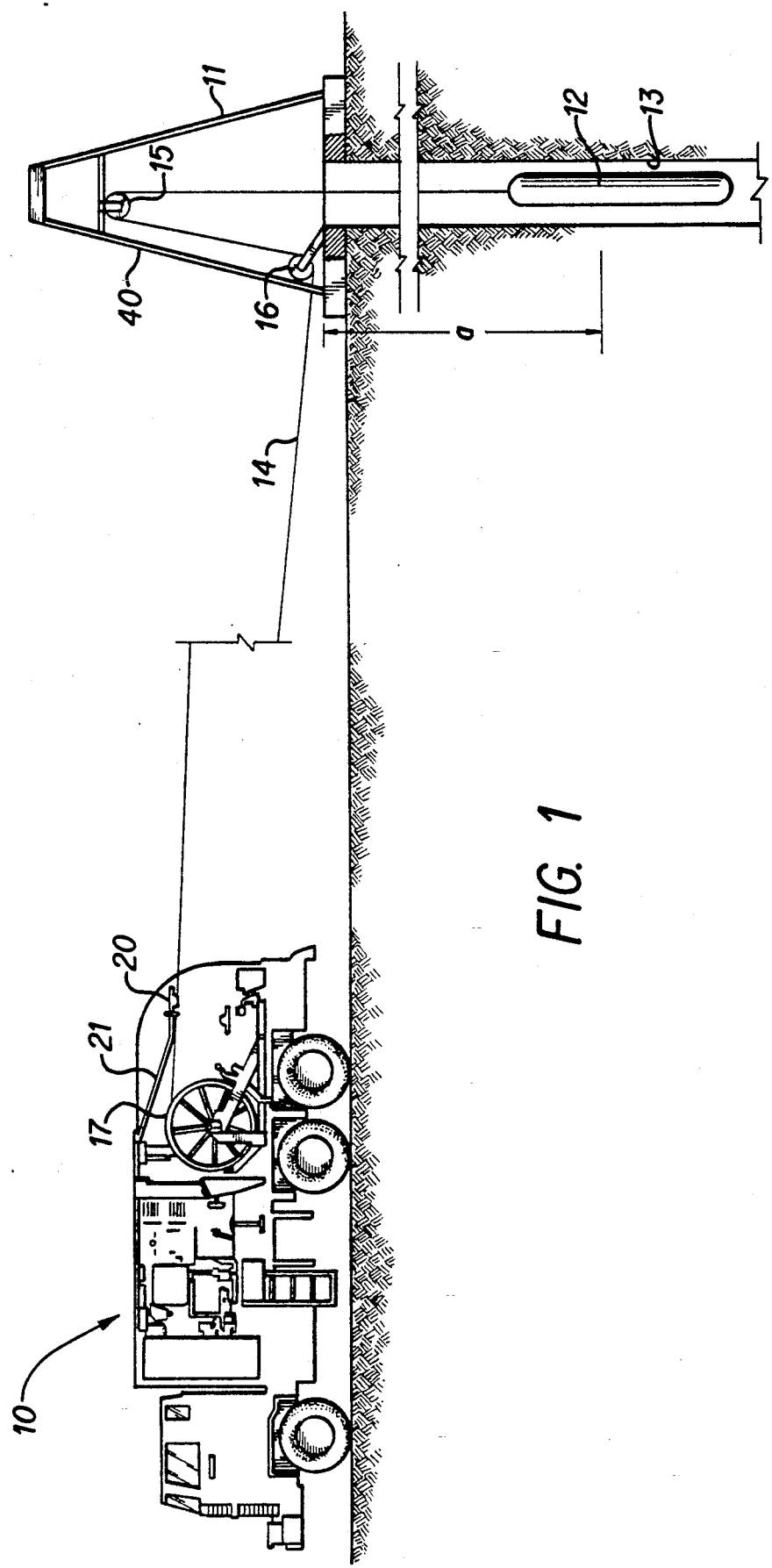
FIG. 1 shows a side view of a typical borehole site set up for depth measuring device, cable spooling, support and alignment sheaves and logging sonde.

Referring now to FIG. 1, there is shown a mobile laboratory unit set up, mounted on a truck 10 near a derrick 11, to lower a logging sonde 12 into a borehole 13 on the end of a cable 14, for investigating the formations traversed by borehole 13. The cable 14 from which the logging sonde 12 is suspended, runs over a support sheave 15 suspended from the derrick 11 and over a bottom sheave 16 aligned with a winch 17 mounted on truck 10. While in use during logging, the cable is guided on and off the winch 17 by spooling arm 21 arranged over winch 17. To measure the depth "a" of logging sonde 12, cable movement on the surface is measured by means of a depth measuring device 20 mounted at the end of spooling arm 21. The depth measuring device 20 is guided along the cable as spooling arm 21 swivels laterally to guide the cable spooling.

The basic operative principle of the depth measuring device 20 shown in FIG. 1 is well-known and is based on the use of at least one, and preferably two encoding wheels disposed tangentially to the cable 14. The rotation of the wheels is detected and the number of revolutions of the wheels is indicative of the length of cable wound on or unwound from winch 17, and is thus indicative of the length "a" of logging sonde 12.

In some cases, magnetic marks previously placed on the cable at regular intervals, such as every 100 feet, may be detected. More details on placement, use and detection of these magnetic marks may be found in U.S. Pat. No. 3,566,478 to D. F. Hurlston which is herein incorporated by reference.

Figure 2:
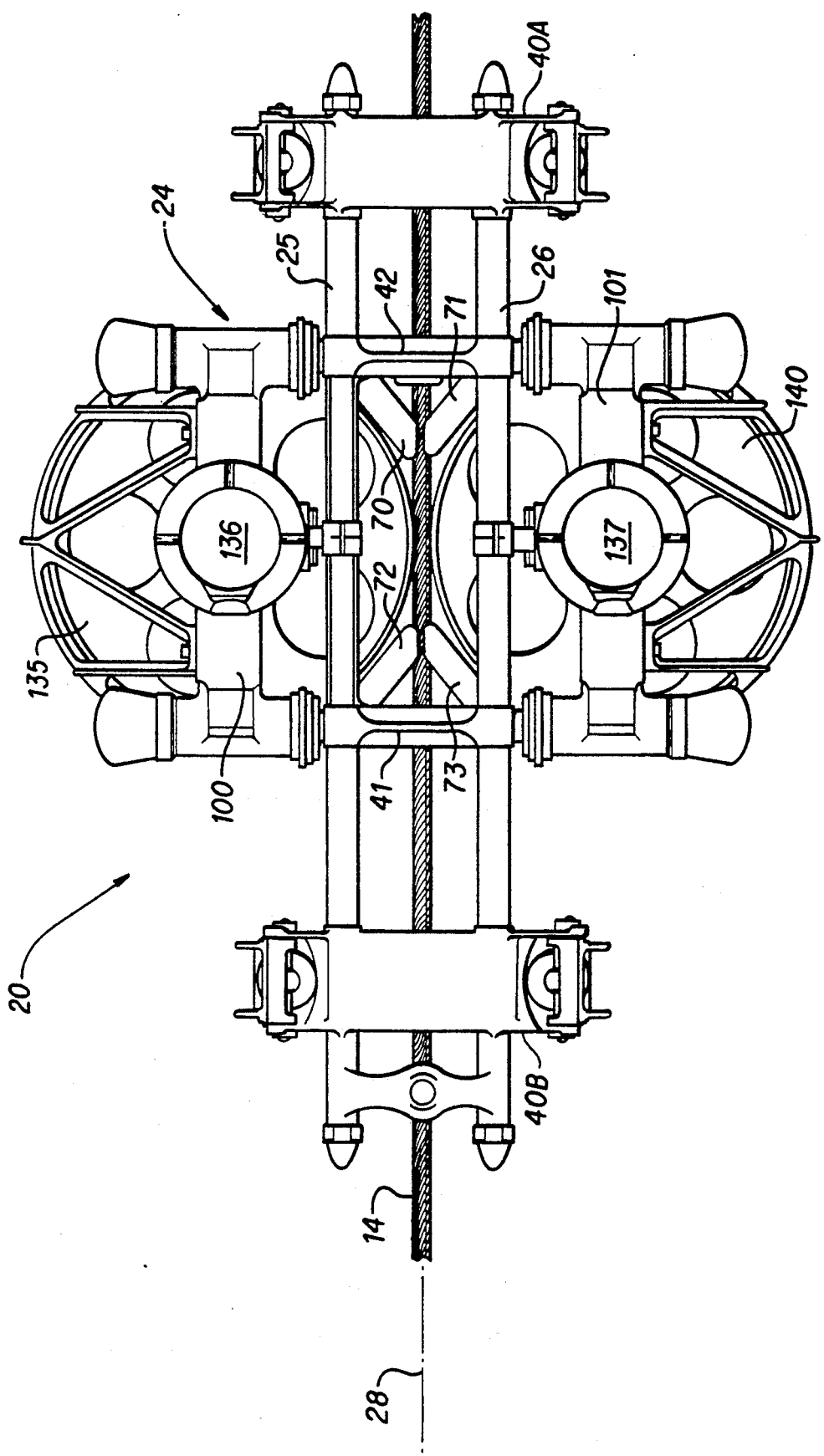
FIG. 2 and 3 are respectively a top view and a cross section view of the device according to the invention.
Figure 3:
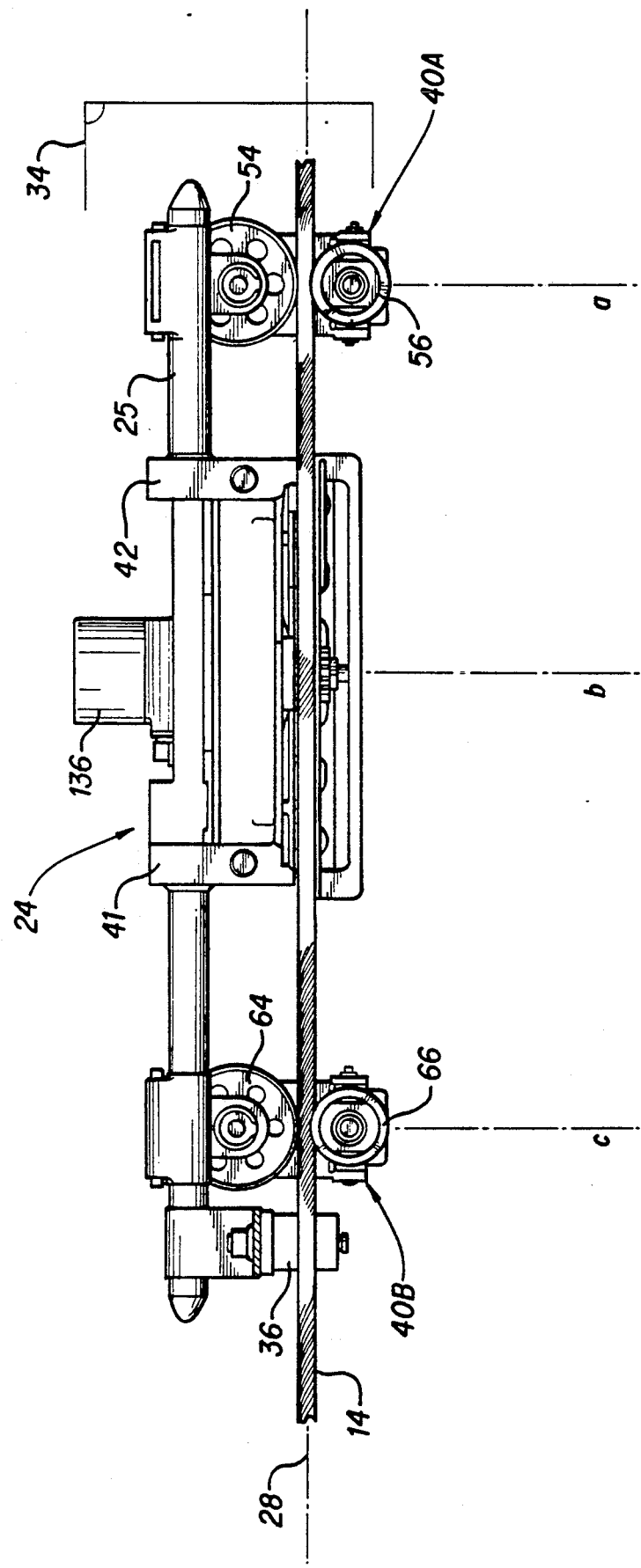

FIG. 2 and FIG. 3 show an example of implementation of a depth measuring device according to the invention. It comprises a chassis 24 including two longitudinal rods 25 and 26 parallel to the cable 14. The longitudinal axis of chassis 24 is defined by the line 28 and plane 34 (see FIG. 3) is a vertical plane of symmetry for rods 25, 26 and with respect to which will be referred the orientation and disposition of the elements of the depth measuring device hereinafter described. Cable 14 is supported and guided on chassis 24 by guide assemblies, respectively upstream 40A and downstream 40B, both disposed substantially at the ends of rods 25, 26. As shown in FIG. 3, each guide assembly 40A and 40B comprises a couple of rollers (54,56) and (64,66) mounted parallel to plane 34. As better seen on FIG. 2, rods 25 and 26 are fixed to two transverse spacers 41, 42 on which are slidably mounted carriages 100 and 101. Transverse spacers 41, 42 can be part of a single element made from one casting. Each carriage 100, 101 is movable transversely to the cable 14 and supports an encoding wheel 135, 140 respectively. The encoding wheels 135, 140 are disposed tangentially to the cable 14 and both in the same plane. The encoding wheels 135 and 140 are e.g. made of metal, such as INVAR or stainless steel. Chassis 24 is linked to spooling arm 21 through a universal joint (not shown for the sake of clarity) disposed in a plane including the vertical guide rollers, and which allows longitudinal axis 28 of the chassis 24 to swivel in any direction around the center of the joint but prevents rotation of the chassis 24 around longitudinal axis 28 and around cable 14.

Carriages 100, 101 are biased to slide towards the cable 14 by springs (not shown). The encoding wheels 135, 140, mounted on the biased carriages, pinch cable 14 and rotate with its movement. The pinching or contact pressures thus generated oppose each other and balance out so that equal contact pressures are exerted on the cable by each encoding wheel.

Lateral spooling forces transmitted from spooling arm 21 to chassis 24 are applied to cable 14 by two vertical guide rollers, only one being shown on FIG. 3 as roller 36.

Two low-torque signal generators 136 and 137 responsive to the rotation of measurement wheels 135 and 140 respectively produce two signals each corresponding to cable movement with respect to the point between the wheels. The generators 136 and 137 may e.g. be of the optical type. The generators 136 and 137 each generates two channels of signals. As described in the above mentioned patent to Hurlston, the relationship between these two channels enables the determination of the direction of rotation and output of a single series of pulses. These series of pulses appear as negative pulses when the wheel is rotated corresponding to decreasing depths as for example, when the cable is moving out of the borehole, or as positive pulses when the cable is running in the borehole. Signal generators of this type are well known and typically provide pulses corresponding to increments (e.g. 0.1 inch) of the encoding wheel circumference.

The depth measuring device, as hereabove described, may comprise further elements, known per se and which are not shown on the drawing, for the sake of clarity, such as e.g. a detector for the detection of magnetic marks made on the cable, and a mechanism for temporarily moving the carriages 100, 101 away from the cable.

More details about the device could be found in the '817 patent already referred to and which is herein incorporated by reference.

As shown on FIG. 3, vertical lines "a" and "c" correspond to the points where the cable is guided by the guide assemblies 40A and 40B. The contact area between the wheels and the cable corresponds to line "b". The distance "a-c", corresponding to the straight line segment of cable, is e.g. two feet long. Roller guide assemblies 40A and 40B are not able to exempt straight segment a-c from all of the forces and torque to which the cable is submitted. This, added to the "natural" curvature of the cable due to the "memory" of the cable wound on the winch for most of the time, will jeopardize the wheels/cable contact area. The longer the "free" segment between the roller guide assemblies, the more difficult it is to maintain straight the cable. Thus, there is provided additional guiding means disposed as close to the wheels/cable contact area as possible. On each side of the tangential contact area is disposed a pair of guide arms 70, 71, 72 and 73 (see FIG. 2). Each arm has one end fixed to the corresponding carriages 100, 101, while the other end bears against or is placed close to the cable in order to guide the latter. The arms 70–73 and encoding wheels 135, 140 are disposed in the same plane. The arms are bent towards the wheels/cable contact area so that their guiding ends are disposed at a distance as short as possible from the wheels/cable contact area, in order to provide a good control of the latter. By way of example, the zone of guidance by arms 70-73 is between half an inch and five inches distant from the wheel/cable contact area.

The guiding arm 70-73 have particular features, according to the invention, which overcome the problem of wear, as will be hereinafter described in connection with FIG. 4-8.

FIG. 4 and 5 shows respectively a perspective view and a side view of one of the guiding arms, referenced 70. FIG. 4 and 5 are not drawn to the same scale. Guiding arm 70 has a substantially elongated shape and its two ends are parallel one to the other. The first end 80 of arm 70 includes a longitudinal hole 82 traversed by a bolt (not shown) for securing arm 70 to the corresponding carriage and a boss 89 which matches with a corresponding slot machined in carriages 100,101 to insure alignment of guiding arms 70-73 with cable 14 and to prevent rotation of guiding arms 70-73 about bolt hole 82 due to forces exerted on guiding arms 70-73 by cable 14. The second end 81 of arm 70 is designed to bear against the cable and comprises a wear resistant insert 83. Insert 83 is L-shaped and comprises a long branch and a short branch. The long branch is fixed on the end of arm 70. Insert 83, on its part facing the arm, comprises a side ledge respectively 84 and 85, (see FIG. 6A and 6B). The side ledges 84, 85 are spaced apart by a distance substantially equal to the width of the arm body. The arm 70 is provided with a back abutment 87 protruding from the end 81 of arm 70, in substantial alignment with the longitudinal axis of arm 70. Side ledges 84 and 85 are designed, when insert 83 is in place, to abut against back abutment 87. This provides significant help for positioning the insert on the arm body. As better seen on FIG. 5, insert 83 is placed in an offset position with respect to the arm. Insert 83 is made out of a wear resistant material, such as e.g. stainless steel, tungsten carbide or ceramic such as $Al_2O_3$, sialon or silicon nitride. The insert is either welded or glued (particularly when made of ceramic) on the end of the arm 70 which is made e.g. out of aluminum.

Figure 7:
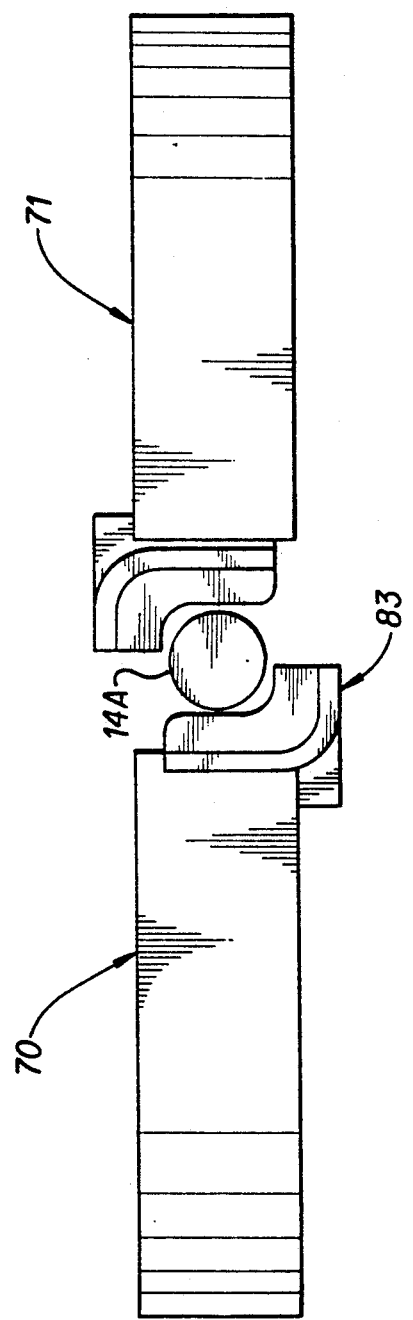
FIG. 7 and FIG. 8 show side views of two opposite arms guiding a cable of two respective diameters.
Figure 8:
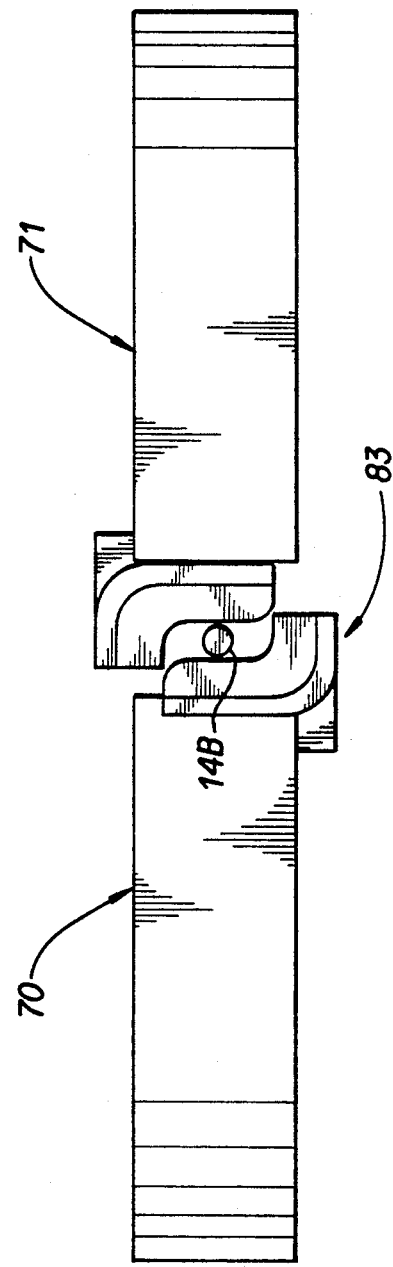

FIG. 7 and 8 show a pair of arms 70, 71 disposed on each side of the cable 14, in a position where the arms guide the cable. The shape and the relative disposition of the inserts 83 at the end of arms are such that the arms can accommodate cables of different diameters, referred to as 14A and 14B on FIG. 7 and 8 respectively.

Although the invention has been described and illustrated with reference to specific embodiments thereof, it will be understood by those skilled in the art that various modifications and variations may be made without departing from the invention concepts disclosed.

What is claimed is:

1. A cable length measuring device, comprising:
   first guide means for maintaining the cable in a straight line along a given segment of a line;
   at least one encoding wheel disposed tangentially to the straight segment cable;
   second guide means disposed between said first guide means and the tangential point of contact, and being made, at least its end bearing against the cable, of a wear resistant material, said second guide means including at least one arm provided, at its end bearing against the cable, with an insert made of said wear resistant material;
   sensors for detecting the revolution of the encoding wheel; and
   means for counting the number of wheel revolutions and converting the revolutions into cable length.

2. The device according to claim 1 wherein said wear resistant insert is made of tungsten carbide.

3. The device according to claim 1 wherein said wear resistant insert is made of ceramic.

4. The device according to claim 3 wherein said ceramic includes $Al_2O_3$.

5. The device according to claim 1 said insert is L-shaped.

6. The device according to claim 1 comprising two encoding wheels both being tangential to the cable, and disposed substantially in the same plane.

7. The device according to claim 1 said second guide means comprises two pairs of arms disposed on either side of said tangential point of contact.

8. The device according to claim 1 wherein the ends of said second guide means contacting the cable are disposed less than five inches apart from the tangential point of contact.

9. The device according to claim 1 wherein said insert is glued on said arm.

10. The device according to claim 1 wherein said insert is offset with respect to said arm.

11. The device according to claim 1 wherein said second guide means are mounted on at least one slidable carriage adapted to be transversely displaced away from said cable.

12. A device for measuring the depth of a logging sonde lowered in a borehole traversing an earth formation through a cable wound on a winch, comprising:
   first guide means for maintaining the cable in a straight line along a given segment of a line;
   at least one encoding wheel disposed tangentially to the straight segment cable;
   second guide means disposed between said first guide means and the tangential point of contact, and being made, at least in its end bearing against the cable, of a wear resistant material, said second guide means including at least one arm provided, at its end bearing against the cable, with an insert made of said wear resistant material;
   sensors for detecting the revolution of the wheel; and
   means for counting the number of wheel revolutions and for converting the revolutions into a depth value of the logging sonde in the borehole.

* * * * *